N. R. MERCHANT.
Seed-Planter.
No. 573.
Patented Jan 20. 1838.
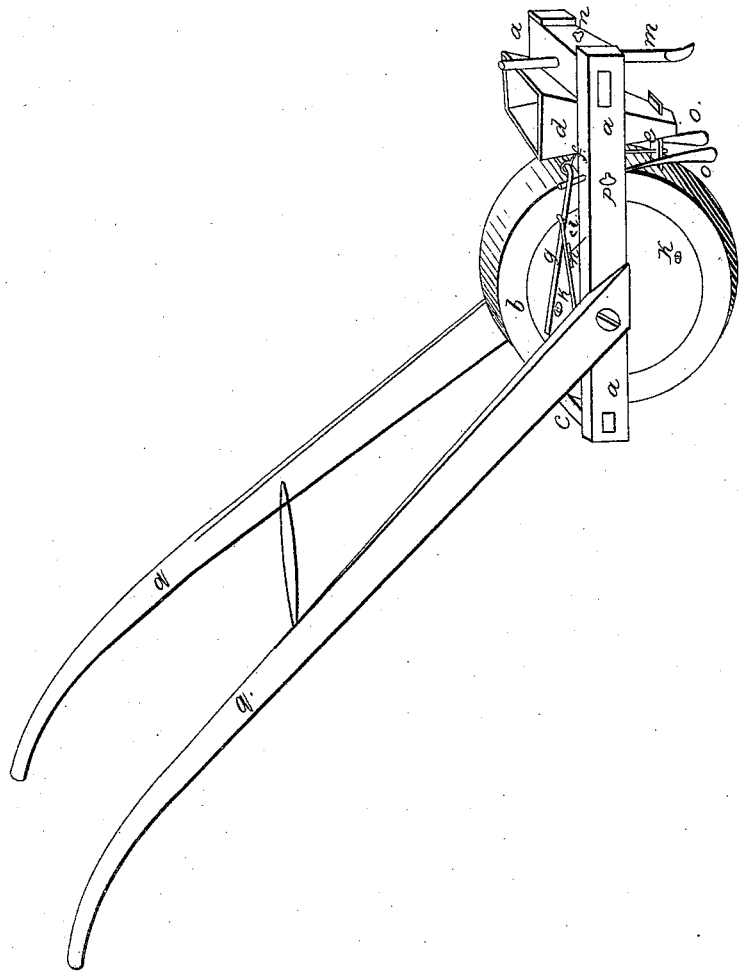
Witnesses:
A. C. Moses
Dwight Andrews
Inventor:
Niram R Merchant

UNITED STATES PATENT OFFICE.

NIRAM R. MERCHANT, OF GUILFORD, NEW YORK.

IMPROVEMENT IN THE MACHINE FOR SOWING OR PLANTING RUTA-BAGA AND OTHER SEEDS OR GRAIN.

Specification forming part of Letters Patent No. 573, dated January 20, 1838.

*To all whom it may concern:*

Be it known that I, NIRAM R. MERCHANT, of the town of Guilford, county of Chenango, and State of New York, have invented a new and useful machine for sowing or planting ruta-baga and all other seeds or grains that may be sown or planted in drills; and I do hereby declare that the following is a full and exact description.

The nature of my invention consists of a machine or drill-barrow so constructed that by moving it forward on the ground it makes a small furrow, drops the seeds, and covers them at one operation, thereby saving the labor of ten or twelve men, besides doing the work much better than can be done by hand.

To enable others skilled in the art to make and use my invention, I will proceed to describe its construction and operation.

I make a frame, $a\ a$, of timber, the size about one and one-half inch square and about seventeen inches long, in which I frame two cross-pieces near the ends, making the frame about thirteen inches by five on the inside. I then make a solid wheel, $b$, about ten inches in diameter and four inches thick. Through the center of this wheel is a shaft or axis five inches long, with iron pivots which run in the side pieces of the frame. The edge of the wheel runs within a quarter of an inch of the back cross-piece, $c$, the frame lying horizontal. This wheel answers the double purpose of supporting the machine and rolling in the seeds after they fall from the hopper.

The hopper $d$ is placed forward of the wheel $b$ and made to hold about a pint of seeds. There is an opening at the bottom of the hopper about one-half an inch square, and provided with a horizontal iron slide, $e\ e$, with a small hole through it sufficient to let through one or more seeds at a time. To move this slide, I place a small roller, $f$, about one inch in diameter, across the frame between the wheel and hopper, with iron pivots working in the sides pieces of the frame. I then take a wire one-fourth of inch in diameter and fourteen inches long. I then bend it at right angles eight inches from one end. The part eight inches long then becomes a lever, $g$, and lies alongside of the wheel $b$. Two and one-fourth inches of the remaining part of the wire lies on the top of the small roller $f$. It is then bent at right angles downward, and passes through the middle of the small roller, and meets and passes through the slide at $e$. This lever-wire is fastened firmly to the small roller. A spring, $h$, is then fixed on the side piece of the frame, bearing on the lever at $i$. To move this lever there are two pins in the side of the wheel, at $k\ k$, opposite each other, about two inches from the center. Each pin, as the wheel turns, raises the lever $g$. This consequently draws the slide $e\ e$, the small hole through the slide passing by the opening in the bottom of the hopper, and drops one or more seeds. As the pin $k$ passes by the spring $h$ bears down the lever, which again moves the slide and again drops one or more seeds, and so on alternately.

To make the small furrow in the ground for the seed, I put through the cross-piece, forward of the hopper, a kind of colter, $m\ m$, the lower end covered or pointed with iron and held in its place by a thumb-screw, $n$. To cover the seeds, I put two small irons, $o\ o$, three-eighths of an inch in diameter and six inches long, the lower ends flattened. These are put through the side pieces, the lower ends inclining toward each other, and set in such a manner as to move the dirt onto the seeds. These are also held in their proper place by thumb-screws, of which one is seen at $p$ on the under side of the cross-piece $c$. Back of the wheel is fastened a slip of iron, close to the edge of the wheel, to scrape off any dirt that may stick to the wheel.

To manage this machine, I have two handles, $q\ q$, three feet four or six inches long, like the handles of a common plow, and fastened to the side pins of the frame. These proportions are most suitable for sowing ruta-baga or the Swedish turnip, but may be varied to suit larger or smaller seeds. In general it is only necessary to vary the hole through the slide to suit the size of the seeds.

What I claim as my invention, and desire to secure by Letters Patent, is—

The simplicity of construction in placing the hopper forward of the wheel, causing the wheel to answer the double purpose of wheel and roller, also the manner of moving the slide and scraping the dirt from the wheel, substantially as shown and described.

NIRAM R. MERCHANT.

Witnesses:
A. C. MOSES,
DWIGHT ANDREWS.